(12) United States Patent
Li et al.

(10) Patent No.: US 10,754,056 B2
(45) Date of Patent: Aug. 25, 2020

(54) QUICK VEHICLE CHECK SYSTEM AND METHOD ADOPTING MULTI-DOSE REGIONAL SCANNING

(71) Applicants: TSINGHUA UNIVERSITY, Beijing (CN); NUCTECH COMPANY LIMITED, Beijing (CN)

(72) Inventors: Ying Li, Beijing (CN); Jianmin Li, Beijing (CN); Tao Song, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 452 days.

(21) Appl. No.: 14/972,115

(22) Filed: Dec. 17, 2015

(65) Prior Publication Data
US 2016/0178791 A1 Jun. 23, 2016

(30) Foreign Application Priority Data
Dec. 17, 2014 (CN) .......................... 2014 1 0780161

(51) Int. Cl.
*G01N 23/04* (2018.01)
*G01V 5/00* (2006.01)
(52) U.S. Cl.
CPC .......... *G01V 5/0041* (2013.01); *G01V 5/0016* (2013.01); *G01V 5/0066* (2013.01)
(58) Field of Classification Search
CPC .. G01V 5/0016; G01V 5/0041; G01V 5/0066; G01V 5/0008; G01V 5/0025;
(Continued)

(56) References Cited

U.S. PATENT DOCUMENTS 6,031,890 A * 2/2000 Bermbach ............ G01V 5/0016
378/206
7,039,159 B2 * 5/2006 Muenchau ............. G01N 23/04
378/57
(Continued)

FOREIGN PATENT DOCUMENTS

CN 101162209 B 8/2010
CN 102105815 A 6/2011
(Continued)

OTHER PUBLICATIONS

European search report for EP15200514 dated May 19, 2016, 8 pages.

*Primary Examiner* — Irakli Kiknadze
(74) *Attorney, Agent, or Firm* — Kilpatrick Townsend & Stockton, LLP

(57) ABSTRACT

A quick vehicle check system comprises a radiation source which produces a first X ray with a first dose and a second X ray with a second dose, wherein the first dose is smaller than the second dose, and the first X ray is used for checking a first part of a checked vehicle and the second X ray is used for checking a second part of the checked vehicle; a first sensor for detecting a set position of the checked vehicle; a second sensor for detecting a passing distance of the checked vehicle; and a control unit coupled with the first sensor and the second sensor, which receives the set position of the checked vehicle from the first sensor and receives the passing distance of the checked vehicle from the second sensor.

12 Claims, 5 Drawing Sheets

(58) Field of Classification Search
CPC .. G01V 5/0033; G01V 5/0083; G01V 5/0091; G01V 5/005; G01V 5/0075; G01V 5/00; B07C 2501/0036; B07C 5/3416; B07C 5/3427; B07C 5/346; G01T 3/008; G01T 7/00; G01T 7/12; G21K 1/093; G21K 1/043; G21K 1/02; G21K 1/04; H01J 2235/081; H01J 2235/086; H01J 35/08; H01J 35/14; G01C 19/5783; A61K 2035/122; A61K 35/12; C23C 18/1605; C23C 18/1692; C23C 18/1696; C23C 18/1889; C23C 18/30; C23C 18/31; G02F 2001/136295; H01B 13/0026; C12N 1/08; C12N 9/22; G01N 23/04; G01N 21/9508; G01N 23/046; G01N 2223/419; G01N 23/005; G01N 23/06; G01N 23/083; G01N 23/203; G01N 23/222; G01N 27/24; G01N 27/72; G01N 21/90; G01N 21/9018; G01N 21/9027; G01N 21/94; G01N 21/95; G01N 23/02; G01N 2223/639; G01N 23/087; G01N 23/10; G01N 23/18; G01N 33/5014; G01N 33/5023; G01N 33/5073; G01M 17/00; G06K 9/00771; A61B 2503/06; A61B 5/0004; A61B 5/0022; A61B 5/1451; A61B 5/14532; A61B 5/4839; A61B 5/746; G06F 19/00; G06F 19/30; G06F 21/6245; B62D 57/02; C12Q 2600/142; C12Q 2600/158; H04N 13/207; H04N 13/254; H04N 13/296; H04N 13/337
USPC .............................................. 378/57, 58, 62
See application file for complete search history.

(56) References Cited

U.S. PATENT DOCUMENTS

| | | | |
|---|---|---|---|
| 7,693,261 | B2 | 4/2010 | Robinson et al. |
| 7,989,770 | B2 * | 8/2011 | Chen .................... G01V 5/0016 250/354.1 |
| 9,817,151 | B2 * | 11/2017 | Morton ................ G01V 5/0041 |
| 2004/0258198 | A1 | 12/2004 | Carver et al. |
| 2009/0316136 | A1 | 12/2009 | Chen et al. |
| 2013/0039462 | A1 | 2/2013 | Morton |

FOREIGN PATENT DOCUMENTS

| | | |
|---|---|---|
| CN | 101163369 B | 7/2011 |
| CN | 103984035 A | 8/2014 |
| EP | 1 970 700 A1 | 9/2008 |

* cited by examiner

QUICK VEHICLE CHECK SYSTEM AND METHOD ADOPTING MULTI-DOSE REGIONAL SCANNING

TECHNICAL FIELD

The present application claims the priority to Chinese Patent Application No. 201410780161.7, filed on Dec. 17, 2014 with the State Intellectual Property Office of the People's Republic of China, which is incorporated herein by reference in its entirety.

BACKGROUND ART

In the field of X-ray security check, a X-ray vehicle check system consists of a X-ray imaging sub-system, a scanning control sub-system, an operation check sub-system and an radiation security sub-system, wherein the X-ray imaging sub-system is the core of the whole system and is composed of a radiation source, detectors and a data acquisition and control module, and the X-ray imaging sub-system is configured to generate X-ray transmitting and/or scattering image. When a checked container/vehicle is scanned, the radiation source generates high-energy X-ray pulses transmitting the checked goods, and an array of high-sensitivity detectors receives X-rays and converts them into output signal, and a series of digital image signals are generated in real-time by the data acquisition and control module. When the whole scanning procedure is completed, the system automatically generates a complete image of the checked vehicle.

A conventional container/vehicle quick check system adopts an accelerator as the radiation source for scan imaging of the container. It is found out in the field of X-ray security check that, security check efficiency will be largely improved if a driver can drive the vehicle through the X-ray check system instead of performing a "park—get off—scan—drive" procedure. However, in order to ensure penetration power and image quality, X-rays output by the radiation source have relatively high dose rates. However, in most commercial working environment, when a high-dose X-ray source is used for imaging, the ray dose accumulated in the driver during such scanning process will be at an unacceptable level. As specified in ANSI/HPS N43.17-2009, the dose received by the driver one time cannot exceed 0.25 μSv. Therefore, as shown in FIG. 1, in order to guarantee radiation security of the driver, it is necessary to dodge the cab part and start high-dose X-ray scanning behind the cab and at a safe distance away from the cab, so as to avoid the out-of-limit X-ray dose for the driver which is caused by the scattering generated during high-dose X-ray scanning of the radiation source which starts immediately after the driver is dodged. As for a container vehicle, there is an enough interval between its cab and the rear containers, and thus, such a method can be employed without losing scanning information of the containers. However, in addition to checking containers in a harbor, the current vehicle quick check system is increasingly applied to land border vehicle check and vehicle security check in some important places. In such application scenarios, in addition to container trucks, common vans, minivans, and even large buses need to be checked. For a van, its rear carriage is very close to its front cab, so that if a high-dose X-ray scanning starts after leaving an interval as safe distance, a part of the carriage behind the cab will have no scanning image. For other types of vehicles which need to be checked, such as minivans, large buses, a part of vehicle body will have no scanning images either. There exists a relatively high risk of supervision for customs smuggling check or security check.

SUMMARY OF INVENTION

The present disclosure proposes a quick vehicle check system adopting multi-dose regional scanning which can perform secure scanning on the whole carriage without damaging the driver's security.

In one respect, a quick vehicle check system adopting multi-dose regional scanning is provided, and comprises a radiation source which produces a first X ray with a first dose and a second X ray with a second dose, wherein the first dose is smaller than the second dose, and the first X ray is used for checking a first part of a checked vehicle and the second X ray is used for checking a second part of the checked vehicle; a first sensor for detecting a set position of the checked vehicle; a second sensor for detecting the passing distance of the checked vehicle; and a control circuit coupled with the first sensor and the second sensor, which receives the set position of the checked vehicle from the first sensor and receives the passing distance of the checked vehicle from the second sensor, and when it is determined that the set position of the checked vehicle reaches a scanning region, the control circuit informs the radiation source to emit the first X ray; and when the passing distance of the checked vehicle reaches the predetermined distance, the control circuit informs the radiation source to emit the second X ray, so that the second part is scanned.

In another respect, a quick vehicle check method with multi-dose regional scanning is provided, and comprises steps of emitting a first X ray of a first dose when it is detected that a set position of a checked vehicle reaches a scanning region; scanning a second part of the checked vehicle with a second X-ray of a second dose when the checked vehicle has passed a predetermined distance and scanning of a first part of the checked vehicle is completed, wherein the first dose is smaller than the second dose; and stopping X-ray scanning after the second part of the checked vehicle has passed through the scanning region.

BRIEF DESCRIPTION OF DRAWINGS

The present disclosure can be more comprehensively understood in combination with figures and following descriptions with reference to the figures, comprising.

DESCRIPTION OF EMBODIMENTS

To further clarify objects, technical solutions and advantages of the present disclosure, the technical solutions of the present application will be further described in combination with exemplary embodiments, with reference to figures.

Figures 1, 2A:
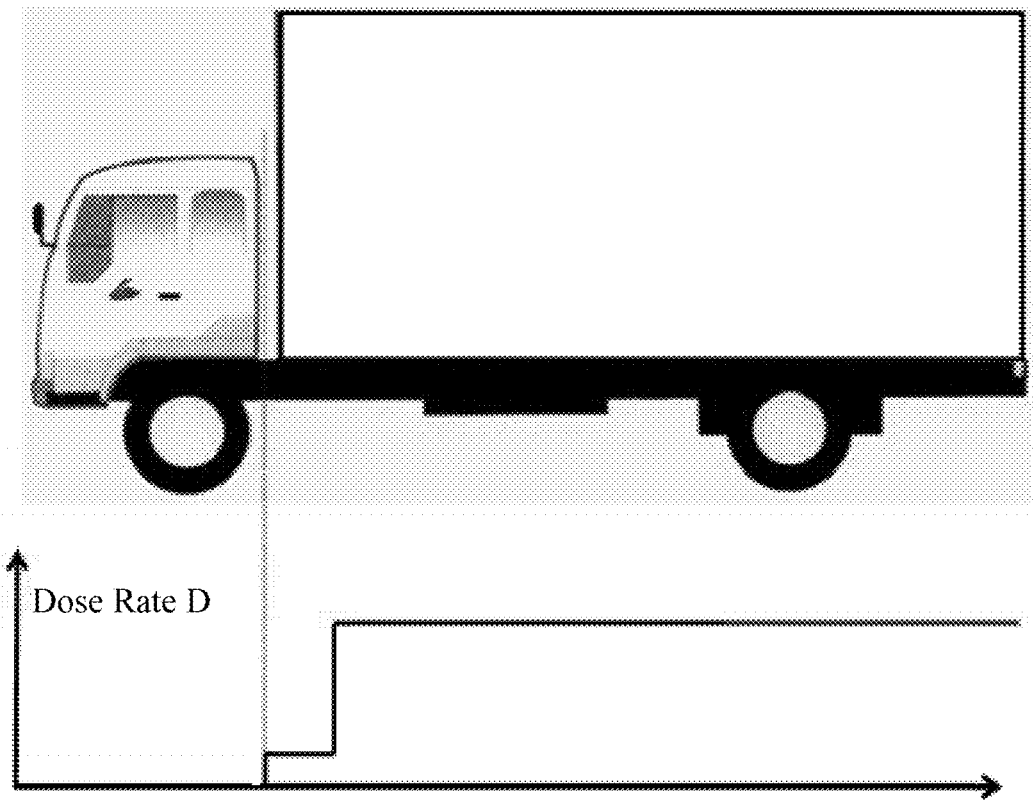
FIG. 1 illustrates a chart of dose rates in a cab dodging solution in the prior art.
FIG. 2a illustrates a chart of dose rates during scanning a whole vehicle with different doses for different regions according to an embodiment of the present disclosure.

FIG. 2a illustrates a chart of dose rates during scanning a whole vehicle with different doses for different regions. In the embodiment illustrated in FIG. 2, the checked vehicle is a van Similar to that illustrated in FIG. 1, in the embodiment illustrated in FIG. 2a, it is necessary to dodge the cab part of the vehicle to ensure radiation security for the driver. However, it is different from the prior art as illustrated in FIG. 1 in that, instead of starting high-dose X-ray scanning at a safe distance away from the cab and behind the cab, the vehicle is scanned with a first X-ray of low dose immediately behind the cab. In particular, scattering resulted from the scanning of the vehicle with the first X-ray of low dose would not cause out-of-limit X-ray dose for the driver. After the vehicle has passed a first predetermined distance, a second X-ray with high dose is employed to scan the remaining part of the vehicle with a second predetermined distance. Scattering resulted from the scanning with the second X-ray of high dose at a first distance away from the cab would not cause out-of-limit X-ray dose for the driver either.

Figure 4A:
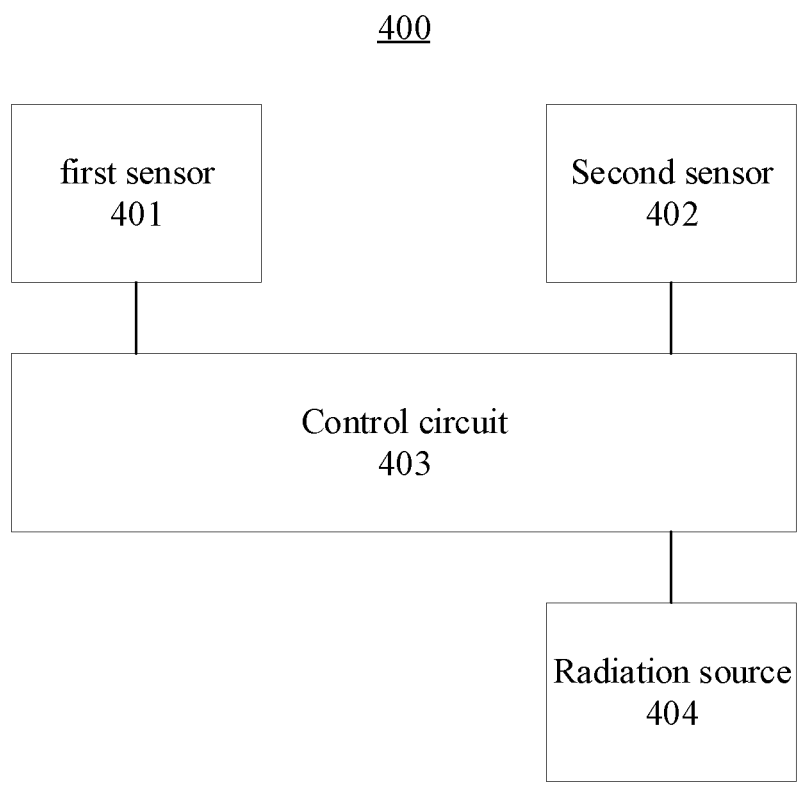
FIG. 4a illustrates a quick vehicle check system according to an embodiment of the present disclosure.

In one implementation, as shown in FIG. 4a, a quick vehicle check system 400 adopting multi-dose regional scanning according to the present disclosure is employed. The system 400 comprises a radiation source 404, a first sensor 401, a second sensor 402 and a control unit 403. The radiation source 404 produces a first X ray with low dose and a second X ray with high dose. The first X-ray and second X-ray can be dual-energy rays generated from the same one radiation source, or can be respectively generated from two radiation sources. The control unit 403 is coupled with the first sensor 401 and the second sensor 402. The first sensor 401 detects a set position of the checked vehicle and informs the set position of the checked vehicle to the control unit 403, and the second sensor 402 detects a passing distance of the checked vehicle and informs the control unit 403 the passing distance of the checked vehicle. In embodiments of the present disclosure, the sensor can be an active sensor or a passive sensor. The active sensor can be a millimeter wave sensor which senses whether the driver passes the scanning region. The passive sensor can be an infrared sensor, light curtain or photoelectric switch. When the control unit 403 determines that the set position of the checked vehicle reaches the scanning region, the control unit 403 informs the radiation source 404 to emit the first X ray. When the cab passes the scanning region, that is, has traveled a predetermined distance, the control unit 403 informs the radiation source 404 to emit the second X ray, so as to scan the remaining part of the checked vehicle. In one embodiment, the second sensor 402 can be a speed sensor, which detects a distance passed by the checked vehicle based on the detected vehicle speed and the vehicle traveling time after the vehicle reaches the scanning region. In another embodiment, the second sensor 402 can be a position sensor such as ground induction coil, photoelectric switch, light curtain, laser scanner, and the distance from the second sensor 402 to the first sensor 401 is equal to the above predetermined distance. A controller determines that the checked vehicle has traveled the predetermined distance after it is informed by the first sensor 401 that the checked vehicle has passed the set position and also informed by the position sensor that the checked vehicle has passed the position sensor.

In the embodiment illustrated in FIG. 2a, the set position of the checked vehicle is at a rear edge of the cab, and the predetermined distance can be obtained from a specific vehicle type library, depending on the vehicle type, or can be manually specified by inputting it into the control unit 403 after manual identification or measurement. In other embodiments, the set position of the checked vehicle can be front edge of a carriage or an arbitrary position between the front edge of the cab and at a rear edge of the carriage. It is to be noted that, the doses of the first X-ray and second X-ray can be adjusted so that scattering generated by the first X-ray in a first scanning region and scattering generated by the second X-ray in a second scanning region would not cause out-of-limit X-ray dose for the driver.

Figure 2B:
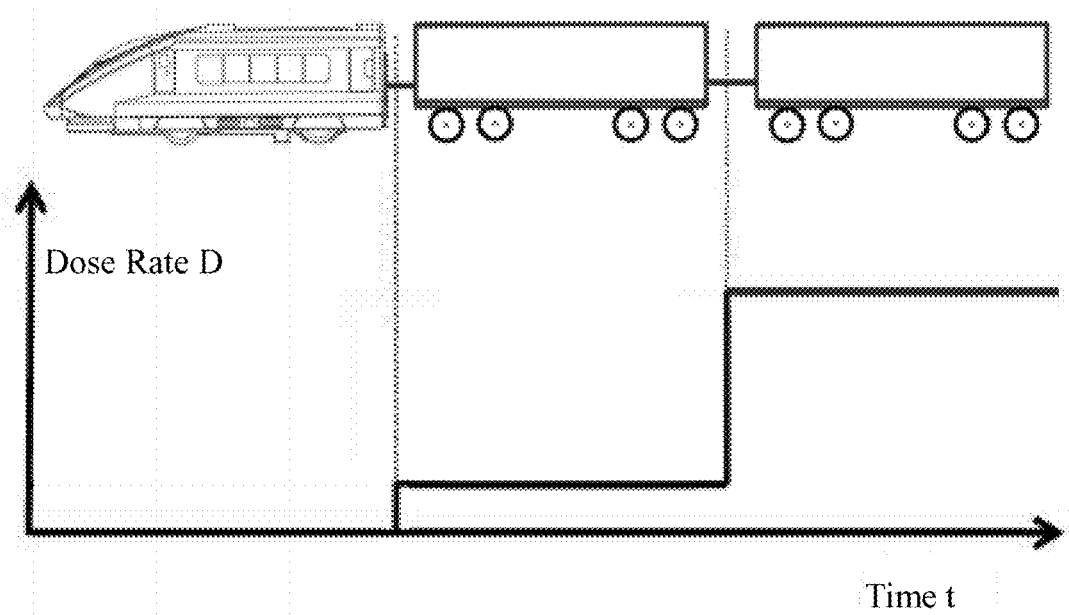
FIG. 2b illustrates a chart of dose rates during scanning a train with different doses for different regions according to another embodiment of the present disclosure.

FIG. 2b illustrates a chart of dose rates during scanning a train with different doses for different regions. As an example, FIG. 2b illustrates three segments of the train: train head, first carriage and second carriage. In the embodiment, X-ray scanning is not applied to the train head, the first carriage is scanned with a first X-ray of low dose and the second carriage is scanned with a second X-ray of high dose. In particular, scattering generated by scanning of the first carriage with the first X-ray of low dose would not cause out-of-limited X-ray dose for the driver. After the first carriage of the train passes through the scanning area, the second X-ray of high dose is used for scanning, and scattering generated thereby would not cause out-of-limit X-ray dose for the driver either. After the second carriage of the train has passed through the scanning area, X-ray scanning is stopped.

Similar to the embodiment of FIG. 2a, the embodiment illustrated in FIG. 2b is also implemented by the quick vehicle check system 400 adopting multi-dose regional scanning according to the present disclosure. When a set position of a checked vehicle is detected, scanning of a first carriage with a first X-ray of low dose is started, and after the first carriage of the checked vehicle has passed, a second carriage is scanned with a second X-ray of high dose. After the second carriage of the checked vehicle has passed, X-ray scanning is stopped. In the present embodiment, the set position of the checked vehicle is a hinge joint between the train head and the first carriage. Also, the doses of the first X-ray and second X-ray can be adjusted so that scattering generated by the first X-ray in the first carriage and scattering generated by the second X-ray in the second carriage would not cause out-of-limit X-ray dose for the driver. It is apparent for those skilled in the art that dodging the respective parts of the train is not limited to those described in the above embodiments. As for a train, a carriage carrying persons may be the cab at the train head or may be an intermediate passenger carriage. So, the train head, the intermediate passenger carriage, or the like may be dodged by means of different setting of sensors.

Furthermore, for the van as illustrated in FIG. 2a, the predetermined distance may be 1 m to 1.5 m, while for the train as illustrated in FIG. 2b, the second predetermined distance may be set as 10 m since its speed is relatively high and its carriages are relatively long. Generally, the predetermined distance(s) may be set based on sensors and lengths of carriages, for example.

Figure 3A:
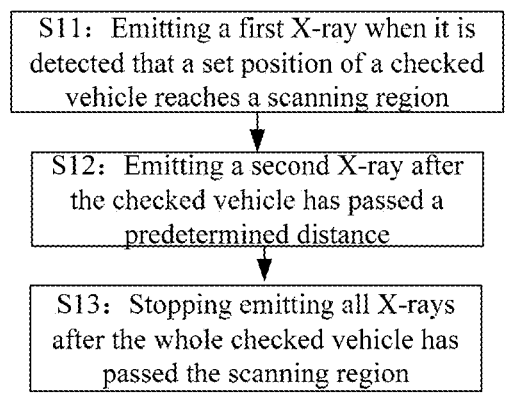
FIG. 3a illustrates a flowchart of scanning a whole vehicle with different doses for different regions according to an embodiment of the present disclosure.

FIG. 3a illustrates a flowchart of scanning a whole vehicle with different doses for different regions according to an embodiment of the present disclosure. At step S11, a first X-ray is emitted when detecting that a set position of the checked vehicle reaches a scanning region. At step S12, a second X-ray is emitted after the checked vehicle has passed a predetermined distance. The dose of the first X-ray is lower than that of the second x-ray. At step S13, after the entirety of the checked vehicle has passed the scanning region, X-ray emission is stopped.

Figure 3B:
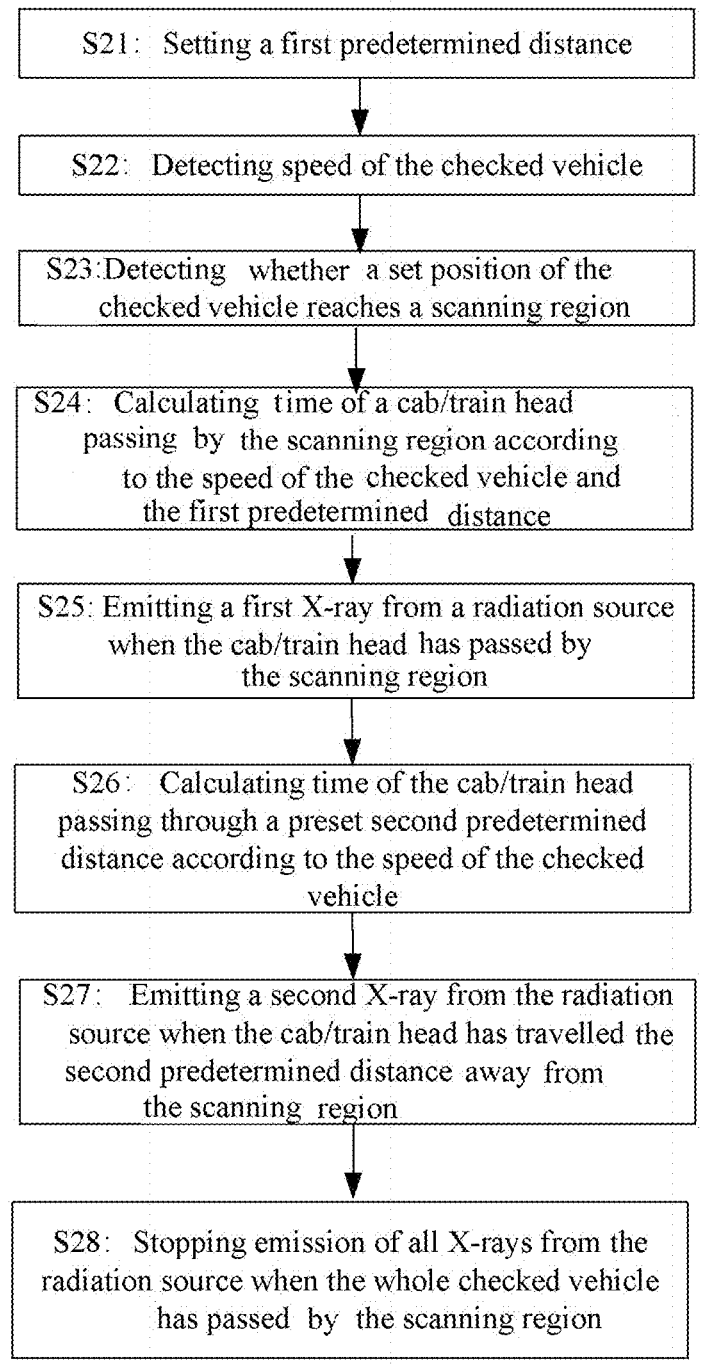
FIG. 3b illustrates a flowchart of scanning a train with different doses for different regions according to another embodiment of the present disclosure.

FIG. 3b illustrates a flowchart of scanning a train with different doses for different regions according to another embodiment of the present disclosure. At step S21, a first predetermined distance is set. At step S22, speed of the checked vehicle is detected. At step S23, it is detected whether a set position of the checked vehicle reaches a scanning region. At step S24, a time for a cab/train head passing through the scanning region is calculated from the speed of the checked vehicle and the predetermined distance. At step S25, when the cab/train head passes the scanning region, a radiation source emits a first X-ray. At step S26, a time for the cab/train head passing through a preset second predetermined distance is calculated from the speed of the checked vehicle. At step S27, when the cab/train head has passed through the second predetermined distance away from the scanning region, a radiation source emits a second X-ray. At step S28, when the entirety of the checked vehicle has passed the scanning region, X-ray emission is stopped.

Figure 3C:
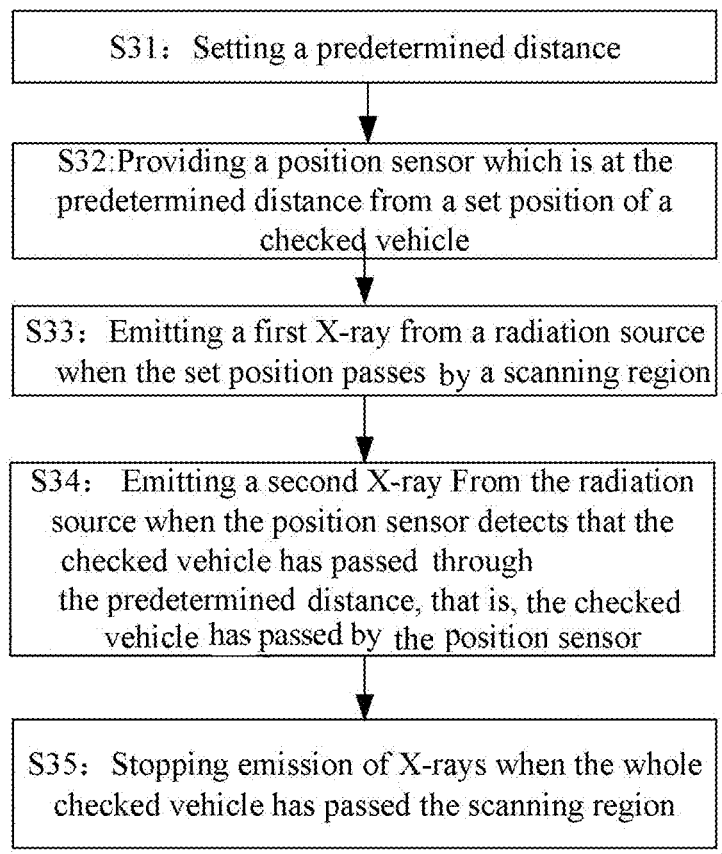
FIG. 3c illustrates a flowchart of scanning a whole vehicle with different doses for different regions according to yet another embodiment of the present disclosure.

FIG. 3c illustrates a flowchart of regional scanning with different doses for a whole vehicle according to yet another embodiment of the present disclosure. At step S31, a predetermined distance is set. At step S32, a position sensor is provided, which is at the predetermined distance away from the set position of the checked vehicle. At step S33, a radiation source emits a first X-ray when the set position passes a scanning region. In step S34, when the position sensor detects that the checked vehicles has traveled the predetermined distance, that is, the checked vehicle passes the position sensor, the radiation sources emits a second X-ray. At step S35, when the entirety of the checked vehicle has passed the scanning region, X-ray emission is stopped.

The above discloses are only specific embodiments of the present disclosures, and the present disclosure is not so limited. Those skilled in the art can envisage a variety of variations and modifications for the present disclosures without departing from the scope and spirit of the present disclosure. It is apparent that such variations and modifications all are in the protection scope claimed by the present disclosure.

The invention claimed is:

1. A quick vehicle check system adopting multi-dose regional scanning comprising:
    a radiation source configured to produce a first X ray with a first dose and a second X ray with a second dose, wherein the first dose is smaller than the second dose, and the first X ray is used for checking a first part of a checked vehicle having a predetermined distance and the second X ray is used for checking a second part of the checked vehicle;
    a first sensor configured to detect a set position of the checked vehicle;
    a second sensor configured to detect a passing distance of the checked vehicle which is a distance traveled by the checked vehicle since the detection of the set position of the checked vehicle; and
    a control unit coupled with the first sensor and the second sensor, configured to receive the set position of the checked vehicle from the first sensor and receive the passing distance of the checked vehicle from the second sensor, and when it is determined that the set position of the checked vehicle reaches a scanning region, the control unit informs the radiation source to emit the first X ray; and when the passing distance of the checked vehicle reaches the predetermined distance, the control unit informs the radiation source to emit the second X ray so as to scan the second part wherein the set position of the checked vehicle is at a rear edge of a cab, front edge of a carriage or an arbitrary position therebetween.

2. The quick vehicle check system according to claim 1, wherein the second sensor is a speed sensor which determines whether the checked vehicle has passed the predetermined distance according to vehicle speed and the elapsed time.

3. The quick vehicle check system according to claim 1, wherein the second sensor is a position sensor, and the distance from the first sensor to the second sensor is equal to the predetermined distance.

4. The quick vehicle check system according to claim 1, wherein the first X-ray and/or the second X-ray is dual-energy rays.

5. The quick vehicle check system according to claim 1, wherein the checked vehicle is a van or a train.

6. The quick vehicle check system according to claim 1, wherein scattering generated by the first X-ray in the first part and scattering generated by the second X-ray in the second part do not cause out-of-limit X-ray dose for a driver.

7. A quick vehicle check method with multi-dose regional scanning comprising steps of:
    emitting a first X ray of a first dose when it is detected that a set position of a checked vehicle reaches a scanning region;
    scanning a second part of the checked vehicle with a second X-ray of a second dose when the checked vehicle has passed a predetermined distance since the detection of the set position of the checked vehicle and scanning of a first part of the checked vehicle is completed, wherein the first dose is smaller than the second dose; and
    stopping X-ray scanning when the second part of the checked vehicle has passed through the scanning region,
    wherein the set position of the checked vehicle is at a rear edge of a cab, front edge of a carriage or an arbitrary position therebetween.

8. The quick vehicle check method according to claim 7, wherein whether the checked vehicle has passed the predetermined distance is detected according to vehicle speed and the elapsed time.

9. The quick vehicle check method according to claim 7, wherein a position sensor is employed to detect whether the checked vehicle has passed the predetermined distance, and the distance from the position sensor to the set position is equal to the predetermined distance.

10. The quick vehicle check method according to claim 7, wherein the first X-ray and/or the second X-ray is dual-energy rays.

11. The quick vehicle check system according to claim 7, wherein the checked vehicle is a van or a train.

12. The quick vehicle check system according to claim 7, wherein scattering generated by the first X-ray in the first part and scattering generated by the second X-ray in the second part do not cause out-of-limit X-ray dose for a driver.

* * * * *